United States Patent
Sakajo et al.

(10) Patent No.: US 10,916,787 B2
(45) Date of Patent: Feb. 9, 2021

(54) FUEL CELL SYSTEM

(71) Applicant: TOYOTA JIDOSHA KABUSHIKI KAISHA, Toyota (JP)

(72) Inventors: Yuichi Sakajo, Kariya (JP); Takashi Koyama, Kariya (JP); Ryo Yoshioka, Toyota (JP); Takahiro Yamafuji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/156,386

(22) Filed: Oct. 10, 2018

(65) Prior Publication Data
US 2019/0115605 A1     Apr. 18, 2019

(30) Foreign Application Priority Data
Oct. 16, 2017  (JP) .................................. 2017-199999

(51) Int. Cl.
| | |
|---|---|
| *H01M 8/04291* | (2016.01) |
| *H01M 8/04007* | (2016.01) |
| *H01M 8/04492* | (2016.01) |
| *H01M 8/04701* | (2016.01) |

(52) U.S. Cl.
CPC ... *H01M 8/04291* (2013.01); *H01M 8/04007* (2013.01); *H01M 8/04067* (2013.01); *H01M 8/04492* (2013.01); *H01M 8/04738* (2013.01); *H01M 2250/20* (2013.01)

(58) Field of Classification Search
CPC ......... H01M 8/04291; H01M 8/04067; H01M 8/04738; H01M 8/04007; H01M 8/04492; H01M 8/04029; H01M 8/04768; H01M 2250/20
See application file for complete search history.

(56) References Cited

U.S. PATENT DOCUMENTS

| | | | |
|---|---|---|---|
| 2003/0148155 A1* | 8/2003 | Matthews | ......... H01M 8/04029 429/430 |
| 2007/0007194 A1* | 1/2007 | Yoshida | .................. B60L 58/30 210/359 |

FOREIGN PATENT DOCUMENTS

| | | | |
|---|---|---|---|
| JP | 2006-318827 A | | 11/2006 |
| JP | 2006318827 | * | 11/2006 |

* cited by examiner

*Primary Examiner* — Ula C Ruddock
*Assistant Examiner* — Matthew W Van Oudenaren
(74) *Attorney, Agent, or Firm* — Oliff PLC

(57) ABSTRACT

A fuel cell system includes a water supply unit configured to supply water from a first water storage unit to a second water storage unit, and a water usage unit uses water in the second water storage unit. The first and second water storage units store produced water form the fuel cell. When the amount of water stored in the first water storage unit exceeds a first predetermined value and the amount of water stored in the second water storage unit is smaller than a second predetermined value, water is supplied from the first water storage unit to the second water storage unit. When water is being used by the water usage unit, water is supplied from the first water storage unit to the second water storage unit even when the amount of water stored in the second water storage unit is not smaller than the second predetermined value.

5 Claims, 4 Drawing Sheets

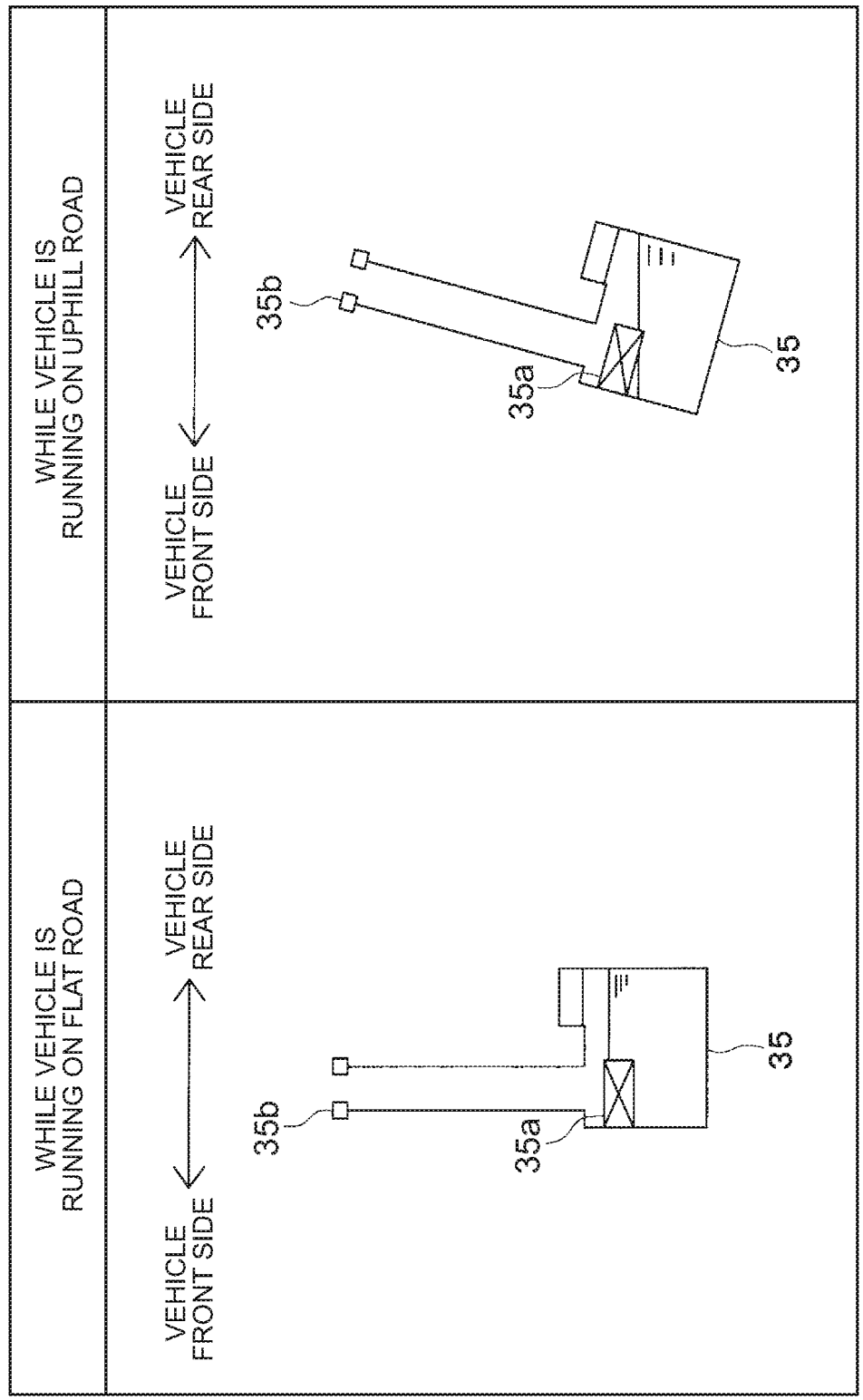

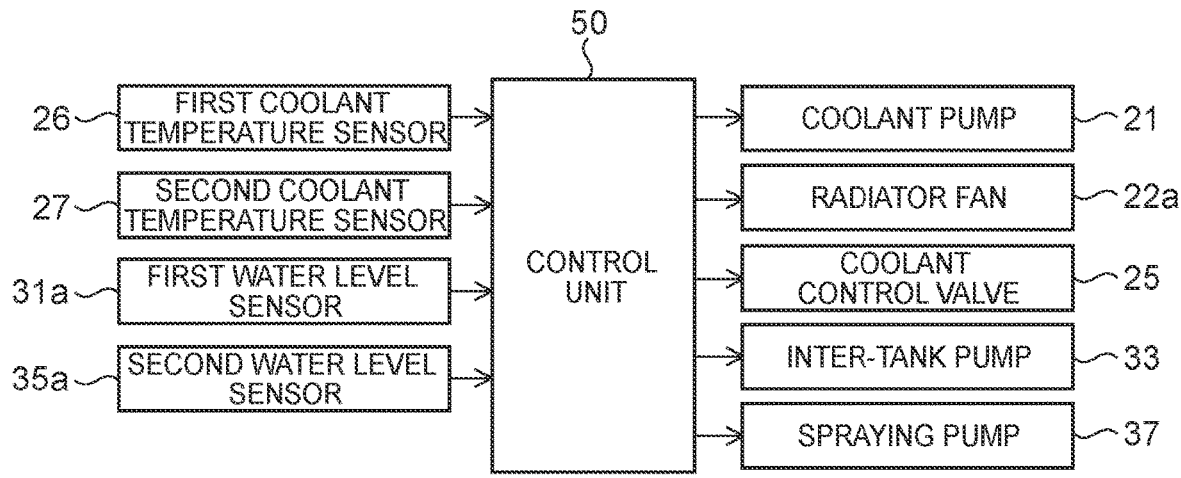
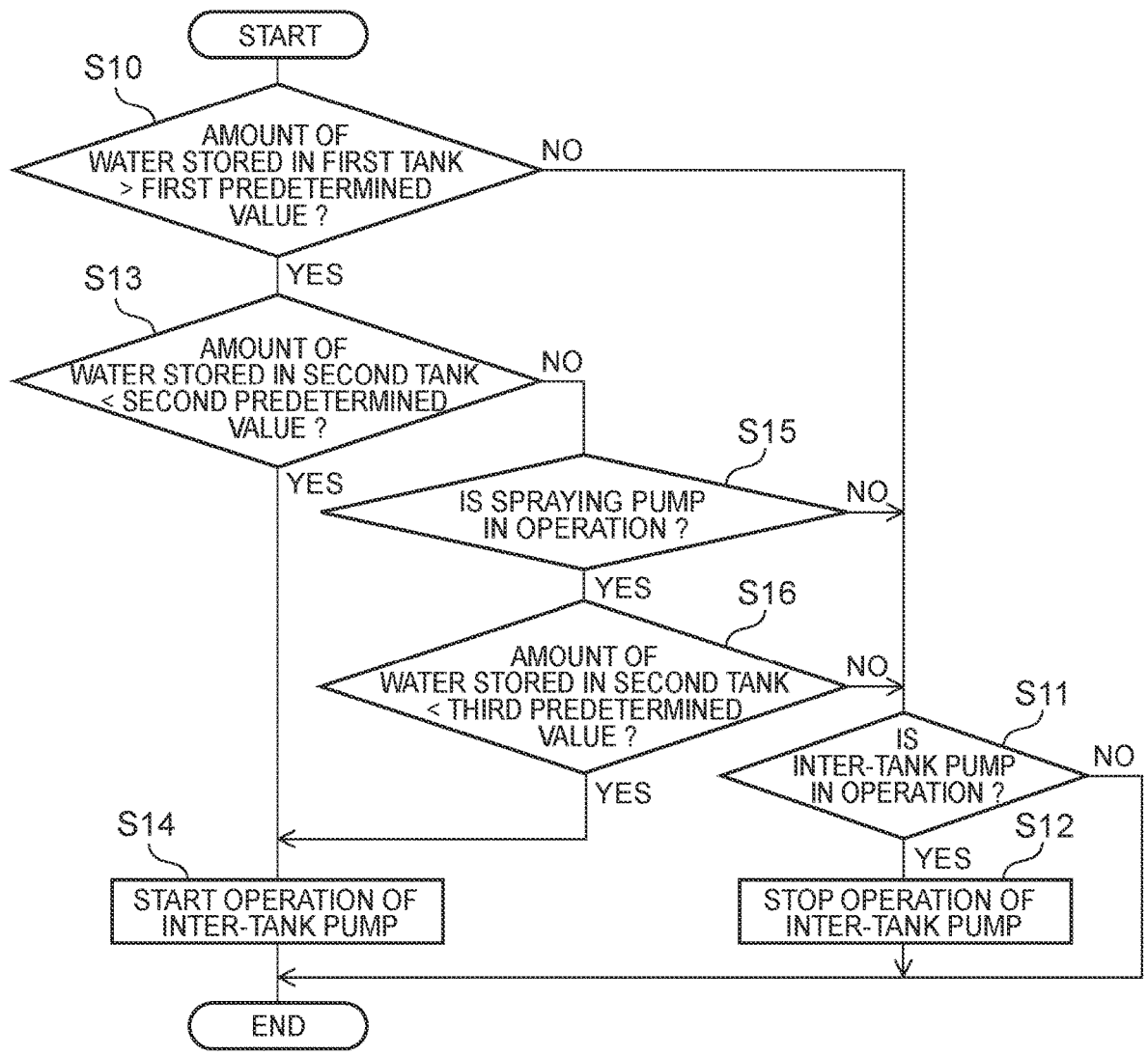

FUEL CELL SYSTEM

INCORPORATION BY REFERENCE

The disclosure of Japanese Patent Application No. 2017-199999 filed on Oct. 16, 2017 including the specification, drawings and abstract is incorporated herein by reference in its entirety.

BACKGROUND

1. Technical Field

The disclosure relates to a fuel cell system that stores produced water from a fuel cell in a plurality of water storage units.

2. Description of Related Art

Japanese Unexamined Patent Application Publication No. 2006-318827 (JP 2006-318827 A) suggests that first and second water storage units that recover and store produced water from a fuel cell are provided, produced water recovered from the fuel cell is stored in the first water storage unit and, when the amount of water stored in the second water storage unit becomes smaller than a predetermined value, water is supplied from the first water storage unit to the second water storage unit.

SUMMARY

However, with the configuration described in JP 2006-318827 A, there is a possibility that, when water in the second water storage unit is being used, supply of water from the first water storage unit to the second water storage unit delays and, as a result, it is not possible to secure a required amount of water stored in the second water storage unit.

The disclosure secures an amount of water that is required for a plurality of water storage units in a fuel cell system that stores produced water from a fuel cell in the plurality of water storage units.

An aspect of the disclosure provides a fuel cell system. The fuel cell system includes a fuel cell, a first water storage unit, a second water storage unit, a water supply unit, a first water volume detection unit, a second water volume detection unit, a water usage unit, and a control unit. The fuel cell is configured to cause an electrochemical reaction between hydrogen and oxygen. The fuel cell is configured to produce water as a result of the electrochemical reaction. The first water storage unit is configured to store the water recovered from the fuel cell. The second water storage unit is configured to store the water supplied from the first water storage unit. The water supply unit is configured to supply the water from the first water storage unit to the second water storage unit. The first water volume detection unit is configured to detect an amount of water stored in the first water storage unit. The second water volume detection unit is configured to detect an amount of the water stored in the second water storage unit. The water usage unit is configured to use the water in the second water storage unit. The control unit is configured to control supply of the water by the water supply unit. The control unit is configured to, when the amount of the water stored in the first water storage unit exceeds a first predetermined value and the amount of the water stored in the second water storage unit is smaller than a second predetermined value, supply the water from the first water storage unit to the second water storage unit with the water supply unit. The control unit is configured to, when the amount of the water stored in the first water storage unit exceeds the first predetermined value and the water in the second water storage unit is being used by the water usage unit, supply the water from the first water storage unit to the second water storage unit with the water supply unit even when the amount of the water stored in the second water storage unit is not smaller than the second predetermined value.

According to the aspect of the disclosure, when the amount of the water stored in the first water storage unit exceeds the first predetermined value and the amount of the water stored in the second water storage unit is smaller than the second predetermined value, the water is supplied from the first water storage unit to the second water storage unit. Thus, it is possible to secure the amount of the water stored in the second water storage unit, which is required at the time when the water usage unit uses the water.

When the amount of the water stored in the first water storage unit exceeds the first predetermined value and the water in the second water storage unit is being used, the water may be supplied from the first water storage unit to the second water storage unit when the amount of the water stored in the second water storage unit is smaller than a third predetermined value smaller than the second predetermined value.

That is, when the water in the second water storage unit is being used, it is required to secure a large amount of the water in the second water storage unit. Therefore, by changing the amount of the water stored in the second water storage unit, which is a reference to start supplying the water from the first water storage unit to the second water storage unit, to the third predetermined value, it is possible to increase the amount of the water stored in the second water storage unit as compared to when the second predetermined value is set for the reference.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a conceptual view that shows a second tank while a vehicle is running on a flat road and the second tank while the vehicle is running on an uphill road;

FIG. 4 is a block diagram that shows a control system of the fuel cell system; and FIG. 5 is a flowchart that shows water supply control over the fuel cell system.

DETAILED DESCRIPTION OF EMBODIMENTS

Figure 1:
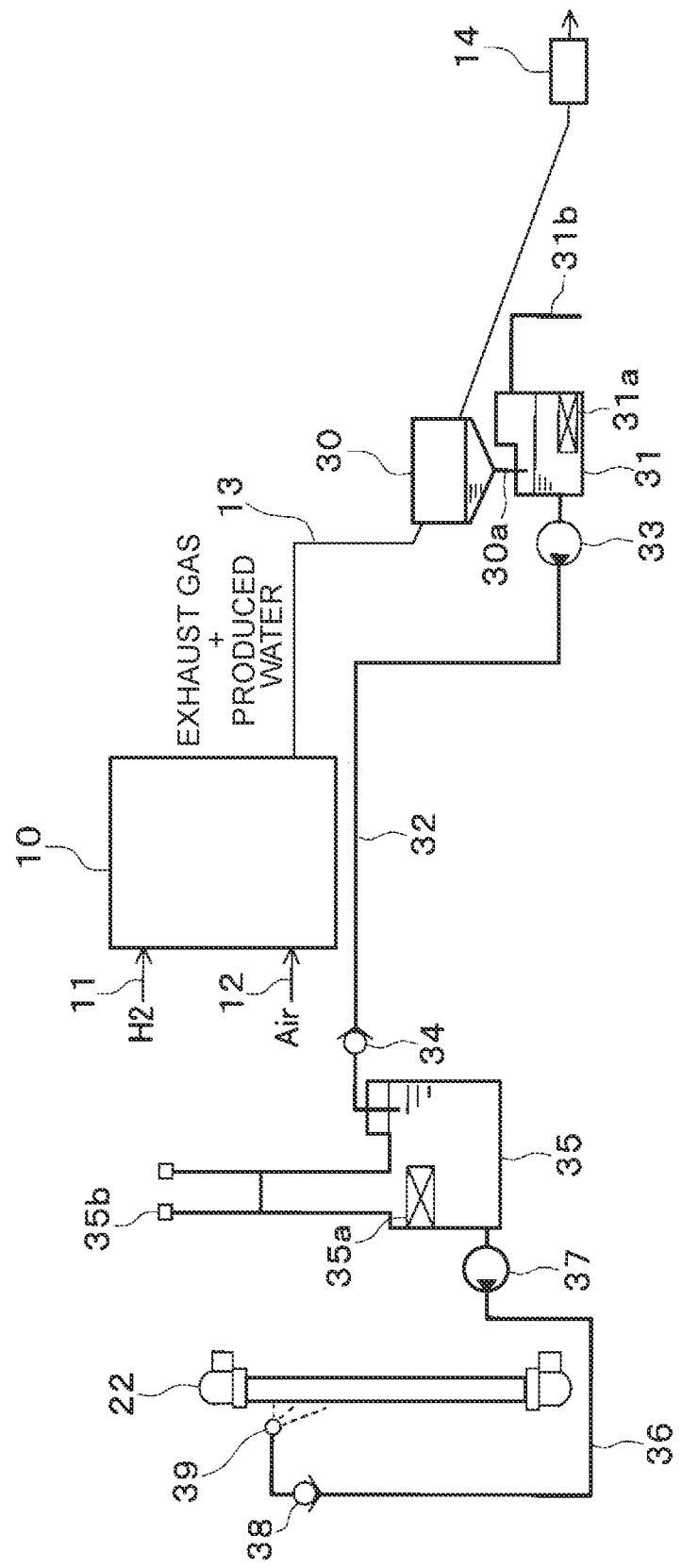
FIG. 1 is a conceptual view that shows the overall configuration of a fuel cell system according to an embodiment.

Hereinafter, an embodiment of the disclosure will be described with reference to FIG. 1 to FIG. 5. FIG. 1 is an overall configuration view that shows a fuel cell system according to the present embodiment. The fuel cell system is applied to a so-called fuel cell vehicle that is a kind of electric vehicle, and supplies electric power to an electric load, such as an electric motor for propelling the vehicle.

As shown in FIG. 1, the fuel cell system includes a fuel cell (FC stack) 10 that generates electric power by using an electrochemical reaction of hydrogen and oxygen. The fuel cell 10 is configured to supply electric power to an electrical device, such as an inverter (not shown). The inverter converts direct current, supplied from the fuel cell 10, to alternating current, supplies the alternating current to the drive motor (load), and drives the motor.

In the present embodiment, a solid polymer electrolyte fuel cell is used as the fuel cell 10, and cells that are base units are stacked on top of each other. Each cell has such a structure that an electrolyte is sandwiched by a pair of electrodes.

Hydrogen is supplied to the fuel cell 10 via a hydrogen supply passage 11. Oxygen is supplied to the fuel cell 10 via an air supply passage 12. In the fuel cell 10, the following electrochemical reaction of hydrogen and oxygen takes place, with the result that electric energy is generated.

(Negative electrode side) $H_2 \rightarrow 2H^+ + 2e^-$ (Positive electrode side) $2H^+ + \frac{1}{2}O_2 + 2e^- \rightarrow H_2O$ For this electrochemical reaction, each electrolyte in the fuel cell 10 needs to be in a wet state in which the electrolyte contains moisture. Therefore, hydrogen and air that are supplied to the fuel cell 10 are humidified, and these humidified gases are supplied to the fuel cell 10. Thus, each electrolyte in the fuel cell 10 is humidified. Hydrogen and air that are supplied to the fuel cell 10 are humidified by a humidifier (not shown), or the like.

Unreacted oxygen not used for the electrochemical reaction is emitted from the fuel cell 10 via an exhaust passage 13 as exhaust gas. In the fuel cell 10, water is produced as a result of the electrochemical reaction, and the moisture is emitted from the fuel cell 10 via the exhaust passage 13 in a state where the moisture is contained in exhaust gas.

When the fuel cell 10 generates electric power, heat is generated through the electrochemical reaction. The fuel cell 10 needs to be kept at a constant temperature (for example, approximately 80° C.) during operation for the sake of power generation efficiency. If the temperature of the electrolytes inside the fuel cell 10 exceeds a predetermined allowable upper limit temperature, the electrolytes break because of high temperature, so the fuel cell 10 needs to be held at an allowable temperature or lower.

Figure 2:
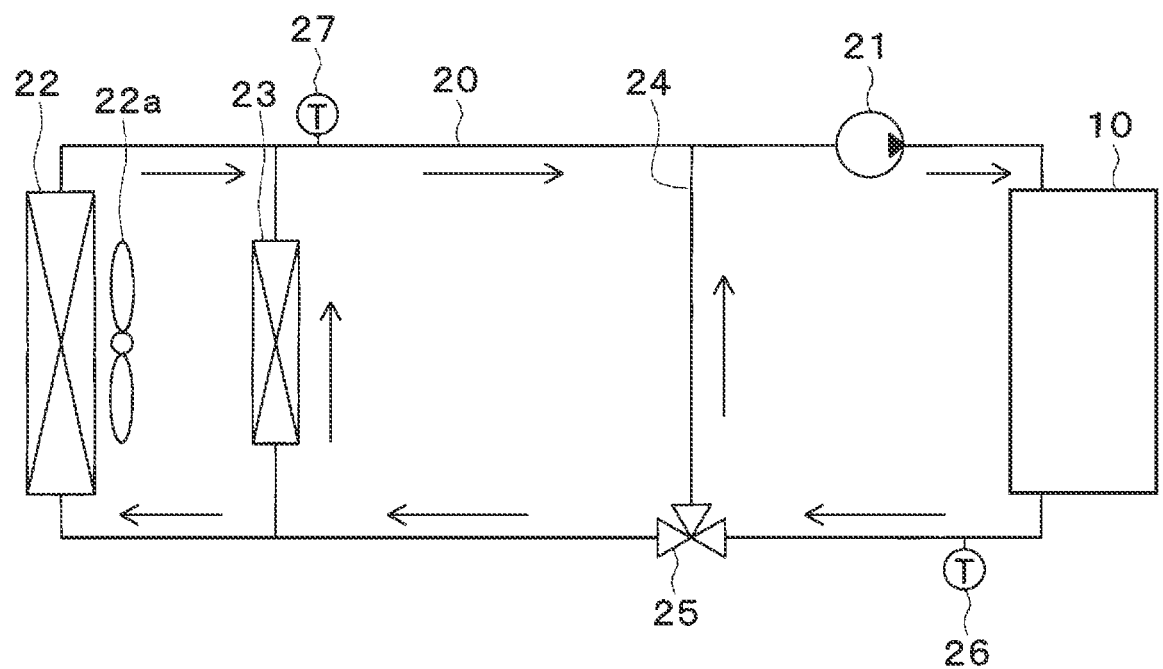
FIG. 2 is a conceptual view that shows a cooling system of the fuel cell system.

As shown in FIG. 2, the fuel cell system includes a coolant passage 20. The coolant passage 20 circulates and supplies coolant to the fuel cell 10. A coolant pump 21 is provided in the coolant passage 20. The coolant pump 21 is used to circulate coolant.

A radiator 22 is provided in the coolant passage 20. The radiator 22 is a heat exchanger. The radiator 22 exchanges heat between coolant that has increased in temperature by the fuel cell 10 and outside air blown by a fan 22a, and releases heat generated in the fuel cell 10 to the outside of the system. The rotation of the fan 22a is controlled by a control unit 50 (described later).

A sub-radiator 23 is provided in the coolant passage 20 in parallel with the radiator 22. The sub-radiator 23 is a heat exchanger. The sub-radiator 23 exchanges heat between coolant and atmosphere, and is used in an auxiliary manner when cooling capacity is insufficient only with the radiator 22, for example, during high load of the fuel cell 10.

A bypass passage 24 is provided in the coolant passage 20. The bypass passage 24 is used to cause coolant to bypass the radiator 22. The bypass passage 24 is provided in parallel with the radiator 22.

A coolant control valve 25 is provided at a branching point at which the bypass passage 24 branches off from the coolant passage 20. The coolant control valve 25 is able to adjust the ratio between the flow rate of coolant flowing through the radiator 22 and the flow rate of coolant flowing through the bypass passage 24 by adjusting the valve opening degree.

A first coolant temperature sensor 26 is provided at the outlet side of the fuel cell 10 in the coolant passage 20. The first coolant temperature sensor 26 detects the temperature of coolant flowing out from the fuel cell 10 (that is, the outlet temperature of the fuel cell 10). A second coolant temperature sensor 27 is provided at the outlet side of the radiator 22 in the coolant passage 20. The second coolant temperature sensor 27 detects the temperature of coolant flowing out from the radiator 22 (that is, the outlet temperature of the radiator 22).

Referring back to FIG. 1, a gas-liquid separator 30 is provided in the exhaust passage 13 through which exhaust gas from the fuel cell 10 passes. The gas-liquid separator 30 constitutes a water recovery unit that recovers produced water from the fuel cell 10, contained in exhaust gas.

A first tank 31 is provided under the gas-liquid separator 30. A communication passage 30a is provided in the gas-liquid separator 30. The communication passage 30a supplies water in the gas-liquid separator 30 to the first tank 31. The distal end of the communication passage 30a is located inside the first tank 31.

Produced water from the fuel cell 10, recovered by the gas-liquid separator 30, is stored in the first tank 31. The first tank 31 needs to be provided vertically under the gas-liquid separator 30, and it is difficult to provide large installation space. Therefore, a small-sized tank is used as the first tank 31.

A first water level sensor 31a is provided in the first tank 31. The first water level sensor 31a detects the level of stored water. The first tank 31 has an emission passage 31b. The emission passage 31b is used to emit redundant water and air inside the first tank 31. The emission passage 31b is provided at the upper part of the first tank 31. When the water level in the first tank 31 exceeds a predetermined upper limit value, water in the first tank 31 is drained to the outside via the emission passage 31b. The first water level sensor 31a may be regarded as a first water volume detection unit of the disclosure.

Stored water in the first tank 31 is allowed to be supplied to a second tank 35 via an inter-tank passage 32. An inter-tank pump 33 is provided in the inter-tank passage 32. The inter-tank pump 33 is used to supply the stored water in the first tank 31 to the second tank 35. A check valve 34 is provided in the inter-tank passage 32 at a portion downstream of the inter-tank pump 33. The check valve 34 prevents backflow of water.

Water supplied from the first tank 31 is stored in the second tank 35. The second tank 35 is larger in volume than the first tank 31. In the present embodiment, the first tank 31 is a sub-tank, and the second tank 35 is a main tank. The first tank 31 may be regarded as a first water storage unit of the disclosure, and the second tank 35 may be regarded as a second water storage unit of the disclosure.

A second water level sensor 35a is provided in the second tank 35. The second water level sensor 35a detects the level of stored water. When the amount of water stored in the second tank 35, detected by the second water level sensor 35a, is small, water is supplied from the first tank 31 to the second tank 35. The second water level sensor 35*a* may be regarded as a second water volume detection unit of the disclosure.

An external communication portion 35*b* is provided in the second tank 35. The external communication portion 35*b* is used to emit redundant air from the inside of the second tank 35 and to supply water to the second tank 35 from the outside.

As shown in FIG. 3, the second water level sensor 35*a* is disposed at a vehicle front side near the front side of the vehicle in the second tank 35. In FIG. 3, the second tank 35 while the vehicle is running on a flat road is shown at the left side, and the second tank 35 while the vehicle is running on an uphill road is shown at the right side.

As shown in FIG. 3, the water surface of stored water in the second tank 35 while the vehicle is running on a flat road is level, whereas the level of stored water in the second tank 35 at the vehicle front side is lower because of the influence of a road gradient while the vehicle is running on an uphill road. Therefore, the water level that is detected by the second water level sensor 35*a* while the vehicle is running on an uphill road is lower than an actual water level.

While the vehicle is running on an uphill road, a coolant temperature increases with an increase in the amount of power generation of the fuel cell 10, with the result that the necessity to spray water on the radiator 22 increases. Therefore, because the water level lower than an actual water level is detected by the second water level sensor 35*a*, it is possible to increase the amount of supply of water from the first tank 31 to the second tank 35.

Referring back to FIG. 1, stored water in the second tank 35 is supplied to a spray unit 39 via a spraying passage 36. The spray unit 39 is a water usage unit. The spray unit 39 uses tank storage water to spray water on the surface of the radiator 22.

A spraying pump 37 is provided in the spraying passage 36. The spraying pump 37 is used to supply stored water in the second tank 35 to the spray unit 39. A check valve 38 is provided in the spraying passage 36 at a portion downstream of the spraying pump 37. The check valve 38 prevents backflow of water.

The spraying pump 37 is able to adjust the flow rate of water that is supplied to the spray unit 39. Adjustment of the flow rate by the spraying pump 37 is performed by, for example, voltage control or duty ratio control.

The spray unit 39 is provided at the distal end of the spraying passage 36. The spray unit 39 is disposed near the upper-side portion of the radiator 22 on a windward side (that is, the vehicle front side) of the radiator 22.

The spray unit 39 includes a housing and a plurality of communication holes (for example, injection nozzles). The housing has an internal space into which water is allowed to flow. The plurality of communication holes communicates the inside of the housing with the outside of the housing, and is able to spray water. The communication holes of the spray unit 39 face the radiator 22, and are able to spray water from the communication holes of the spray unit 39 on the surface of the radiator 22.

By spraying water on the radiator 22, the water evaporates on the surface of the radiator 22. It is possible to improve the cooing capacity of the radiator 22 with the latent heat of vaporization.

Water is sprayed by the spray unit 39 when the amount of heat generation of the fuel cell 10 has increased with an increase in the amount of power generation of the fuel cell 10 and, as a result, the coolant temperature has increased. That is, water is sprayed by the spray unit 39 when it is required to improve the cooling capacity of the radiator 22.

For example, when the outlet temperature of the fuel cell 10 has reached a predetermined allowable upper limit temperature, water may be sprayed by the spray unit 39. The allowable upper limit temperature should be determined based on the heatproof temperature (for example, approximately 110° C.) of the electrolytes of the fuel cell 10, and is a value that may be selectively set.

As shown in FIG. 4, the fuel cell system includes the control unit 50. The control unit 50 controls operations of controlled target devices that constitute the fuel cell system. The control unit 50 is formed of a known microcomputer and its peripheral circuit. The microcomputer includes a CPU, a ROM, a RAM, and the like.

Various pieces of information are input from the coolant temperature sensors 26, 27, the water level sensors 31*a*, 35*a*, and the like, to the control unit 50. Control signals are output from the control unit 50 to the various controlled target devices, such as the coolant pump 21, the radiator fan 22*a*, the coolant control valve 25, the inter-tank pump 33, and the spraying pump 37. The control unit 50 is able to control operations of the controlled target devices based on a control program stored in the ROM.

Supply of water from the first tank 31 to the second tank 35 will be described. If the amount of water stored in the second tank 35 is insufficient at the time when water is sprayed from the spray unit 39 on the radiator 22, it is not possible to spray the required amount of water on the radiator 22, with the result that sufficient cooling capacity possibly cannot be obtained by the radiator 22. Therefore, in the present embodiment, in order for the second tank 35 to secure water required to be sprayed on the radiator 22, water supply control for supplying water from the first tank 31 to the second tank 35 with the inter-tank pump 33 is performed.

Next, the water supply control with the inter-tank pump 33 will be described with reference to the flowchart of FIG. 5. The water supply control shown in FIG. 5 is part of a main routine that is executed by the control unit 50, and is repeatedly executed at predetermined intervals.

Initially, it is determined whether the amount of water stored in the first tank 31, detected by the first water level sensor 31*a*, exceeds a first predetermined value (S10). The first predetermined value is the amount of water stored in the first tank 31, which is required to supply water to the second tank 35.

When it is determined in S10 that the amount of water stored in the first tank 31 does not exceed the first predetermined value (NO in S10), the amount of water stored in the first tank 31 has not reached a required amount that is required to supply water to the second tank 35, so water is not supplied from the first tank 31 to the second tank 35.

When it is determined whether the inter-tank pump 33 is in operation (S11) and the inter-tank pump 33 is in operation (YES in S11), the operation of the inter-tank pump 33 is stopped (S12). Thus, it is possible to avoid operation of the inter-tank pump 33 although the amount of water stored in the first tank 31 is small. As a result, it is possible to avoid unnecessary operation of the inter-tank pump 33, so the electric power consumption of the inter-tank pump 33 is reduced, and vibration and noise are reduced.

When it is determined in S10 that the amount of water stored in the first tank 31 exceeds the first predetermined value (YES in S10), it is determined whether the amount of water stored in the second tank 35, detected by the second water level sensor 35*a*, is smaller than a second predetermined value (S13). The second predetermined value is the amount of water stored in the second tank 35, which is required to spray water on the radiator 22. The second predetermined value is also the amount of stored water, which is a reference to start supplying water from the first tank 31 to the second tank 35.

When it is determined in S13 that the amount of water stored in the second tank 35 is smaller than the second predetermined value (YES in S13), the operation of the inter-tank pump 33 is started (S14). Thus, water is supplied from the first tank 31 to the second tank 35, and the amount of water stored in the second tank 35 increases. On the other hand, when it is determined that the amount of water stored in the second tank 35 is not smaller than the second predetermined value (NO in S13), it is determined whether the spraying pump 37 is in operation (S15).

As a result, when it is determined that the spraying pump 37 is in operation (YES in S15), it is determined whether the amount of water stored in the second tank 35 is smaller than a third predetermined value (S16). The third predetermined value is the amount of water stored in the second tank 35, which is required while water is being sprayed on the radiator 22. The third predetermined value is set to a value larger than the second predetermined value. The third predetermined value is the amount of stored water, which is a reference to start supplying water from the first tank 31 to the second tank 35 while water is being sprayed on the radiator 22.

That is, when water in the second tank 35 is being used, it is required to secure a large amount of water in the second tank 35. Therefore, by changing the amount of water stored in the second tank 35, which is a reference to start supplying water from the first tank 31 to the second tank 35, to the third predetermined value, it is possible to increase the amount of water stored in the second tank 35 as compared to when the second predetermined value is set for the reference.

When it is determined in S16 that the amount of water stored in the second tank 35 is smaller than the third predetermined value (YES in S16), the operation of the inter-tank pump 33 is started (S14). Thus, water is supplied from the first tank 31 to the second tank 35, and the amount of water stored in the second tank 35 increases.

When it is determined in S15 that the spraying pump 37 is not in operation (NO in S15) or when it is determined in S16 that the amount of water stored in the second tank 35 is not smaller than the third predetermined value (NO in S16), it is determined whether the inter-tank pump 33 is in operation (S11). As a result, when the inter-tank pump 33 is in operation (YES in S11), the operation of the inter-tank pump 33 is stopped (S12). Thus, it is possible to avoid unnecessary operation of the inter-tank pump 33.

According to the above-described present embodiment, when the amount of water stored in the first tank 31 exceeds the first predetermined value and the amount of water stored in the second tank 35 is smaller than the second predetermined value, water is supplied from the first tank 31 to the second tank 35. Thus, the second tank 35 is able to secure the amount of stored water, which is required to spray water on the radiator 22.

In the present embodiment, when the amount of water stored in the first tank 31 exceeds the first predetermined value and water in the second tank 35 is being used, water is supplied from the first tank 31 to the second tank 35 when the amount of water stored in the second tank 35 is smaller than the third predetermined value larger than the second predetermined value. In this way, when water in the second tank 35 is being used, it is possible to increase the amount of water stored in the second tank 35 by changing the amount of water stored in the second tank 35, which is a reference to start supplying water from the first tank 31 to the second tank 35, to the third predetermined value as compared to when the second predetermined value is set for the reference.

In the present embodiment, when the amount of water stored in the first tank 31 is smaller than the first predetermined value, the inter-tank pump 33 is not operated. Thus, when the amount of water stored in the first tank 31 is small, it is possible to avoid useless operation of the inter-tank pump 33. As a result, the electric power consumption of the inter-tank pump 33 is reduced, and vibration and noise are reduced.

Other Embodiments

The disclosure is not limited to the above-described embodiment. The disclosure may be modified in various forms as follows without departing from the scope of the disclosure. The devices described in the embodiment may be combined with each other as needed within a feasible range.

(1) In the above-described embodiment, the example in which stored water in the tanks 31, 35 is used to be sprayed on the radiator 22 is described; however, the disclosure is not limited to this configuration. Stored water in the tanks 31, 35 may be used for another purpose. For example, stored water in the tanks 31, 35 may be used to humidify gases that are supplied to the fuel cell 10.

(2) In the configuration of the above-described embodiment, the process of S16 may be omitted. In this case, even when the amount of water stored in the second tank 35 is not smaller than the second predetermined value (NO in S13), but when the spraying pump 37 is in operation (YES in S15), the operation of the inter-tank pump 33 is started (S14). Thus, when water in the second tank 35 is being used, water is supplied from the first tank 31 to the second tank 35 irrespective of the amount of water stored in the second tank 35, with the result that it is possible to increase the amount of water stored in the second tank 35.

(3) In the above-described embodiment, the water level sensors 31*a*, 35*a* that detect the water levels of the tanks 31, 35 are used. Instead of water level sensors, level sensors may be used. When level sensors are used, a level sensor for determining whether the level of stored water has reached the second predetermined value and a level sensor for determining whether the level of stored water has reached the third predetermined value should be provided in the second tank 35.

What is claimed is:

1. A fuel cell system comprising:
   a fuel cell configured to cause an electrochemical reaction between hydrogen and oxygen, the fuel cell being configured to produce water as a result of the electrochemical reaction;
   a first water storage unit configured to store water recovered from the fuel cell;
   a second water storage unit configured to store water supplied from the first water storage unit;
   a water supply unit configured to supply the water from the first water storage unit to the second water storage unit;
   a first water volume detection unit configured to detect an amount of the water stored in the first water storage unit;
   a second water volume detection unit configured to detect an amount of the water stored in the second water storage unit;

a water usage unit configured to use the water in the second water storage unit; and a control unit programmed to control supply of the water by the water supply unit, the control unit being programmed to:

when the amount of the water stored in the first water storage unit exceeds a first predetermined value and the amount of the water stored in the second water storage unit is smaller than a second predetermined value, supply water from the first water storage unit to the second water storage unit with the water supply unit, and when the amount of the water stored in the first water storage unit exceeds the first predetermined value and the water in the second water storage unit is being used by the water usage unit, supply the water from the first water storage unit to the second water storage unit with the water supply unit even when the amount of the water stored in the second water storage unit is not smaller than the second predetermined value.

2. The fuel cell system according to claim 1, wherein the control unit is programmed to, when the amount of the water stored in the first water storage unit exceeds the first predetermined value and the water in the second water storage unit is being used by the water usage unit, supply the water from the first water storage unit to the second water storage unit with the water supply unit when the amount of the water stored in the second water storage unit is smaller than a third predetermined value larger than the second predetermined value.

3. The fuel cell system according to claim 1, wherein:
the fuel cell system is mounted on a vehicle, and
the second water volume detection unit is provided at a vehicle front side near a front side of the vehicle in the second water storage unit.

4. The fuel cell system according to claim 1, further comprising a heat exchanger configured to exchange heat between outside air and a heat exchange medium that has received heat from the fuel cell and release heat generated in the fuel cell to an outside of the system, wherein the water usage unit is a spray unit configured to spray the water in the second water storage unit on the heat exchanger to cool the heat exchanger with latent heat of vaporization of water.

5. The fuel cell system according to claim 1, wherein the control unit is programmed to, when the amount of the water stored in the first water storage unit does not exceed the first predetermined value and the water is being supplied from the first water storage unit to the second water storage unit by the water supply unit, stop supply of the water by the water supply unit.

* * * * *